US 8,839,898 B2

United States Patent
Mimura et al.

(10) Patent No.: US 8,839,898 B2
(45) Date of Patent: Sep. 23, 2014

(54) ELECTRIC VEHICLE

(75) Inventors: Masahide Mimura, Wako (JP); Shin Nabeya, Wako (JP); Keiichiro Niizuma, Wako (JP); Hitoshi Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 13/432,503

(22) Filed: Mar. 28, 2012

(65) Prior Publication Data

US 2012/0247855 A1 Oct. 4, 2012

(30) Foreign Application Priority Data

Mar. 31, 2011 (JP) ................. 2011-080329

(51) Int. Cl.
*B60K 1/00* (2006.01)
*F16H 63/34* (2006.01)
*B60K 1/04* (2006.01)

(52) U.S. Cl.
CPC .............. *F16H 63/3416* (2013.01); *B60K 1/00* (2013.01); *B60K 2001/0422* (2013.01); *B60K 2001/001* (2013.01); *B60Y 2200/122* (2013.01); *B60K 1/04* (2013.01); *Y10S 180/908* (2013.01)
USPC ............................ 180/295; 180/65.1; 180/908

(58) Field of Classification Search
CPC .... B60K 1/00; B60K 2001/001; B60L 11/00; B60Y 2200/122; H02K 7/006; H02K 7/116
USPC ......... 180/65.1, 291, 292, 295, 907, 908, 312
See application file for complete search history.

(56) References Cited

U.S. PATENT DOCUMENTS

| 5,377,791 | A | * | 1/1995 | Kawashima et al. | ......... 188/159 |
| 5,460,234 | A | * | 10/1995 | Matsuura et al. | ............ 180/65.1 |
| 5,696,680 | A | * | 12/1997 | Ichioka et al. | .................. 701/67 |
| 5,832,789 | A | | 11/1998 | Kinto et al. | |
| 5,918,692 | A | * | 7/1999 | Sekita et al. | ..................... 180/56 |
| 6,541,938 | B2 | * | 4/2003 | Okamura et al. | ............. 318/778 |
| 7,182,167 | B2 | * | 2/2007 | Sasamoto | ..................... 180/219 |
| 7,971,673 | B2 | * | 7/2011 | Sasage et al. | ................. 180/220 |
| 8,113,307 | B2 | * | 2/2012 | Holland | ....................... 180/65.1 |

FOREIGN PATENT DOCUMENTS

| JP | 05-161221 A | 6/1993 |
| JP | 06-80041 A | 3/1994 |
| JP | 2010-228626 A | 10/2010 |
| WO | 2010/109969 A1 | 9/2010 |

* cited by examiner

*Primary Examiner* — Frank Vanaman
(74) *Attorney, Agent, or Firm* — Squire Patton Boggs (US) LLP

(57) ABSTRACT

In an electric three-wheeled vehicle, a centrifugal clutch transmits rotary driving power to a counter shaft when the revolution speed of a motor exceeds a prescribed value. The clutch is coaxially located at one end of a motor output shaft. A counter shaft is located inside the outside diameter of the motor in a side view of the vehicle. The motor output shaft, counter shaft, and axles are arranged from a vehicle forward side in the order of mention. The axis center of the counter shaft is located below a line connecting the axis center of the motor output shaft and the axis center of the axle in a side view of the vehicle.

14 Claims, 12 Drawing Sheets

ELECTRIC VEHICLE

BACKGROUND

1. Field

The present invention relates to electric vehicles such as three-wheeled vehicles and more particularly to electric vehicles which run by driving a pair of left and right rear wheels by the driving power of a motor.

2. Description of the Related Art

In the past, there have been known saddle-ride type electric three-wheeled vehicles in which a front fork attached to the forward side of a body frame supports a front wheel and a rear body vertically swingable and transversely tiltable with respect to the body frame is attached on the rearward side of the body frame and a pair of left and right rear wheels driven by a motor are supported on the rear body.

Patent Literature 1 (JP-A No. Hei5-161221) discloses an electric three-wheeled vehicle with a structure (type 1) in which a stepped variable transmission comprised of gear pairs attached to a main shaft and a counter shaft is provided between a motor output shaft and a rear wheel axle, and an electric three-wheeled vehicle with a structure (type 2) in which a belt converter type continuously variable transmission is provided between a motor output shaft and a rear wheel axle.

However, the technology described in Patent Literature 1 has a problem that in the type 1 electric three-wheeled vehicle, the motor output shaft oriented along the vehicle transverse direction and the main shaft supporting a plurality of speed change gears are located on the same axis and thus the dimension of the housing for housing them in the vehicle transverse direction must be larger. It also has a problem that in the type 2 electric three-wheeled vehicle, the driving pulley and driven pulley of the continuously variable transmission must be spaced from each other and thus the dimension of the housing for housing them in the vehicle longitudinal direction must be larger, which suggests that in both types, there is still room to improve the approach to reducing the size of the power unit including the motor and drive system.

SUMMARY

An object of embodiments of the present invention is to address the above problem of the related art and provide a vehicle such as an electric three-wheeled vehicle in which the axial arrangement of the drive system is specially designed to reduce the size of the power unit.

In order to achieve the above object, embodiments of the present invention have a first feature that in an electric three-wheeled vehicle which runs by driving a pair of left and right rear wheels by rotary driving power of a motor supplied with electric power from a battery. A rear body including the motor and the rear wheels is attached at the back of a body frame in a vertically swingable and transversely tiltable manner. The rotary driving power of the motor is transmitted from a motor output shaft to axles of the rear wheels through a counter shaft. A centrifugal clutch which transmits the rotary driving power to the counter shaft when a revolution speed of the motor exceeds a prescribed value is coaxially located at one end of the motor output shaft. The counter shaft is located inside an outer periphery of the motor in a side view of the vehicle. The motor output shaft, the counter shaft, and the axles can be arranged in the order of the motor output shaft, the counter shaft, and the axles from a vehicle forward side in a side view of the vehicle. An axis center of the counter shaft is located below a line connecting an axis center of the motor output shaft and an axis center of the axle in the side view of the vehicle.

A second feature can be that an outer periphery of the motor and an outer periphery of the axle are close to each other.

A third feature is that after the rotary driving power of the motor is transmitted from a gear formed at one end of the motor output shaft to a counter gear engaged with the gear and fixed on the counter shaft, it is transmitted from a gear formed at one end of the counter shaft to an output gear engaged with the gear and fixed on a differential case housing a differential mechanism.

A fourth feature is that the counter gear and the differential case can be located in a way to overlap each other in the side view of the vehicle.

A fifth feature is that the centrifugal clutch, the motor, the counter shaft, and the differential mechanism are arranged from left in a vehicle transverse direction in a plan view of the vehicle in the order of mention.

A sixth feature is that a parking lock mechanism for prohibiting rotation of the rear wheels is provided and a lock gear which is engaged with a lock arm of the parking lock mechanism is fixed coaxially with the motor output shaft before speed reduction.

A seventh feature is that the parking lock mechanism is located above or below the counter shaft in a vehicle vertical direction and in a way to overlap the motor (M) in the side view of the vehicle.

According to certain embodiments, the rotary driving power of the motor is transmitted from the motor output shaft to axles of the rear wheels through the counter shaft. A centrifugal clutch which transmits the rotary driving power to the counter shaft when the revolution speed of the motor exceeds a prescribed value is coaxially located at one end of the motor output shaft. The counter shaft is located inside the outer periphery of the motor in a side view of the vehicle. The motor output shaft, the counter shaft, and the axles are arranged from a vehicle forward side in the order of the motor output shaft, the counter shaft, and the axles in a side view of the vehicle and the axis center of the counter shaft is located below a line connecting the axis center of the motor output shaft and the axis center of the axle in a side view of the vehicle, so the motor output speed can be reduced and the torque can be increased without providing a separate transmission, so that the unit can be compact. In addition, since the centrifugal clutch is coaxially located at one end of the motor output shaft and also the revolution speed of the motor can be increased sufficiently before the engagement of the centrifugal clutch even when a high torque is required, a sufficient torque can be attained due to the reduction gear ratio of the counter shaft even though no transmission is provided. Furthermore, the dimension in the vehicle longitudinal direction can be smaller and the center of gravity can be lower than in a constitution that the motor output shaft, counter shaft and axle are linearly arranged in a row in a side view of the vehicle. In addition, since the centrifugal clutch is located coaxially with the motor, the motor torque is efficiently transmitted to the rear wheels at low revolution speeds. Furthermore, it is possible that only the axle exists on the vehicle rearward side of the motor, which means that the outside diameter of the motor can be increased to the extent that it does not interfere with the axle.

According to certain embodiments, the outer periphery of the motor and the outer periphery of the axle are close to each other, so the outside diameter of the motor can be increased to the extent that it does not interfere with the axle. Consequently, as the outside diameter of the motor is increased, the motor output power is increased, which means that the dimension of the motor in its thickness direction can be decreased and the dimension of the power unit in the vehicle transverse direction can be decreased.

According to certain embodiments, after the rotary driving power of the motor is transmitted from the gear formed at one end of the motor output shaft to the counter gear engaged with the gear and fixed on the counter shaft, it is transmitted from the gear formed at one end of the counter shaft to the output gear engaged with the gear and fixed on the differential case housing a differential mechanism, so power transmission from the motor output shaft to the axle can be achieved by a smaller number of components and a simpler constitution.

According to certain embodiments, the counter gear and the differential case overlap each other in a side view of the vehicle, so the counter shaft and the differential case can be made as close to each other as possible in order to decrease the dimension of the power unit in the vehicle longitudinal direction.

According to certain embodiments, the centrifugal clutch, the motor, the counter shaft, and the differential mechanism are arranged from left in the vehicle transverse direction in a plan view of the vehicle in the order of mention, which means that the motor with a large outside diameter and the differential mechanism can be distributively located left and right of the counter shaft in a plan view of the vehicle so that the distance between the motor output shaft and the axle can be shorter.

According to certain embodiments, a parking lock mechanism for prohibiting rotation of the rear wheels is provided and a lock gear which is engaged with the lock arm of the parking lock mechanism is fixed coaxially with the motor output shaft before speed reduction, so locking can be done by a small-diameter mechanism and the motor output shaft and the parking lock mechanism can be close to each other, permitting reduction in the size of the power unit.

According to certain embodiments, the parking lock mechanism is located above or below the counter shaft in the vehicle vertical direction and in a way to overlap the motor in a side view of the vehicle, so the space created above the counter shaft can be effectively used so that the parking lock mechanism is located there. Consequently the vertical dimension of the power unit can be decreased.

DETAILED DESCRIPTION

Figure 1:
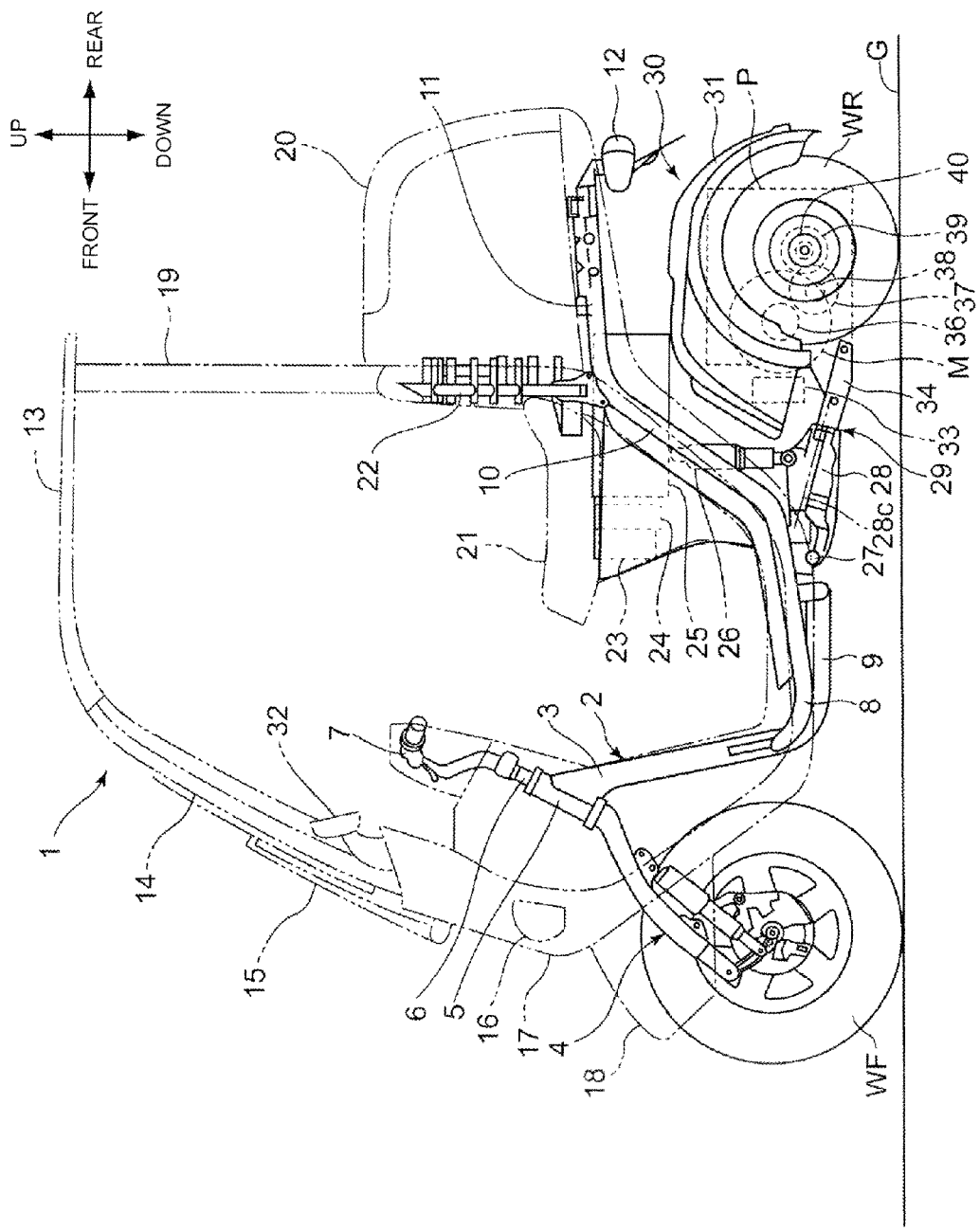
FIG. 1 is a side view of an electric three-wheeled vehicle according to an embodiment of the present invention.

Next, the preferred embodiments of the present invention will be described in detail referring to drawings. FIG. 1 is a side view of an electric three-wheeled vehicle 1 according to an embodiment of the present invention. The electric three-wheeled vehicle 1 is a saddle-ride type vehicle which runs by driving a pair of left and right rear wheels WR by the rotary driving power of a motor M. A head pipe 5 for pivotally supporting a steering stem 6 in a rotatable manner is attached to the front end of a main frame 3 which constitutes a body frame 2. A steering handlebar 7 is attached to the top of the steering stem 6 and a bottom link type suspension (front fork) 4 for pivotally supporting a front wheel WF in a rotatable manner is attached to its bottom.

An under frame 9 in the center in the vehicle transverse direction is joined to the lower part of the main frame 3 and side frames 8 extending in the vehicle rearward direction on the left and right are also attached to it. The rear end of the under frame 9 is joined to the side frames 8 by a connecting pipe oriented along the vehicle transverse direction. The rear parts of the pair of left and right side frames 8 are joined to a pair of left and right standing frames 10 joined to rear frames 11 extending in the vehicle rearward direction respectively.

A vertical swing unit 28 is supported by a pivot shaft 27 in a vertically swingable manner behind the rear end of the under frame 9 under the side frames 8. The upper part of the vertical swing unit 28 is suspended from the standing frames 10 by a rear shock unit 26 located in the center in the vehicle transverse direction. A tilting member 34 which can rotate around a rotary shaft 28c oriented along the vehicle longitudinal direction with its front inclined upward is journaled to the rear end of the vertical swing unit 28.

A damper such as a Neidhardt type damper (not shown) which gives a damper effect to the rotation of the tilting member 34 in a relative rotation part 29 is housed inside the vertical swing unit 28. The tilting member 34 is fixed on a rear body 30 including a pair of left and right rear wheels WR and the motor M. Due to this structure, the electric three-wheeled vehicle 1 provides a rear wheel suspension to swing the whole rear body 30 vertically and also enables the body frame 2 to do tilting motion (banking motion) on the relative rotation part 29 with respect to the rear body 30 to turn and run while the left and right rear wheels WR are on the road surface G.

The rear body 30 includes a power unit P including the motor M and a pair of rear wheels WR is journaled to the power unit P in a rotatable manner. The rotary driving power of the motor M with a motor output shaft 36 is transmitted from the axle 40 to the rear wheels WR through a counter gear 37 fixed on a counter shaft 38 and an output gear 39 located coaxially with the axle 40.

A PDU 33 as a motor control device (motor driver) is located on the vehicle forward side of the motor M. Since the PDU 33 and motor M are close to each other, the length of a three-phase cable for supplying power from the PDU 33 to the motor M can be shortened and power transmission loss and noise contamination can be reduced. Also, since the PDU 33 is located in a forward position of the rear body 30, its heat radiation efficiency is increased. The upper portion of the power unit P is covered by a body cover 31 which also functions as a mudguard for the rear wheels WR.

A high-voltage battery 25 which supplies power to the motor M is located on the body frame 2. The battery 25, virtually a rectangular parallelepiped, is located between the pair of left and right standing frames 10 with its lengthwise side oriented along the vehicle longitudinal direction. A BMU 24 as a battery control device and a contactor 23 are located in front of the battery 25. The BMU 24 has a function to collect information from a monitoring board 54 (see FIG. 4) for monitoring the state of the battery 25. The contactor 23 is an electric component which has a function to open and close the connection between the battery 25 and the drive circuit for driving the motor M.

An arch-like supporting frame 22 which is curved in a projecting form toward the vehicle upward direction is fitted on a part bent between the standing frames 10 and the rear frames 11. The rear end of the battery 25 is in a more rearward position than the joint of the supporting frame 22.

A front cowl 17 with a headlight 16 is located on the vehicle forward side of the head pipe 5. A pair of left and right rearview mirrors 32, a windshield 14 and an electric wiper 15 for the windshield 14 are attached to the upper part of the front cowl 17. A front fender 18 is attached above the front wheel WF. The upper end of the windshield 14 is joined to a roof member 13 which functions as a rain hood for an occupant and the rear of the roof member 13 is joined to a strut 19 supported by the supporting frame 22. A large trunk 20 is located between the supporting frame 22 and the rear frames 11 and a tail lamp unit 12 is located at the rear ends of the rear frames 11.

A seat 21 is located on the vehicle forward side of the supporting frame 22 and the contactor 23, BMU 24, and battery 25 are located under the seat 21. Due to this constitution, various electric components such as the battery 25 as a heavy item, the contactor 23 and the BMU 24 can be located around the center of the vehicle body, permitting mass concentration. Also, the rear body 30, which can swing vertically and tilt transversely with respect to the body frame 2, can be lighter than in a constitution in which the battery and so on are located on the rear body, so the unspring weight of the rear wheel suspension can be reduced to improve the road surface followability of the rear wheels WR. Furthermore, since the rear body 30 is lighter, the swing mechanism and the framework of the rear body 30, etc. are not required to have a very high rigidity, permitting structural simplification and improvement in the degree of freedom in design.

Figure 2:
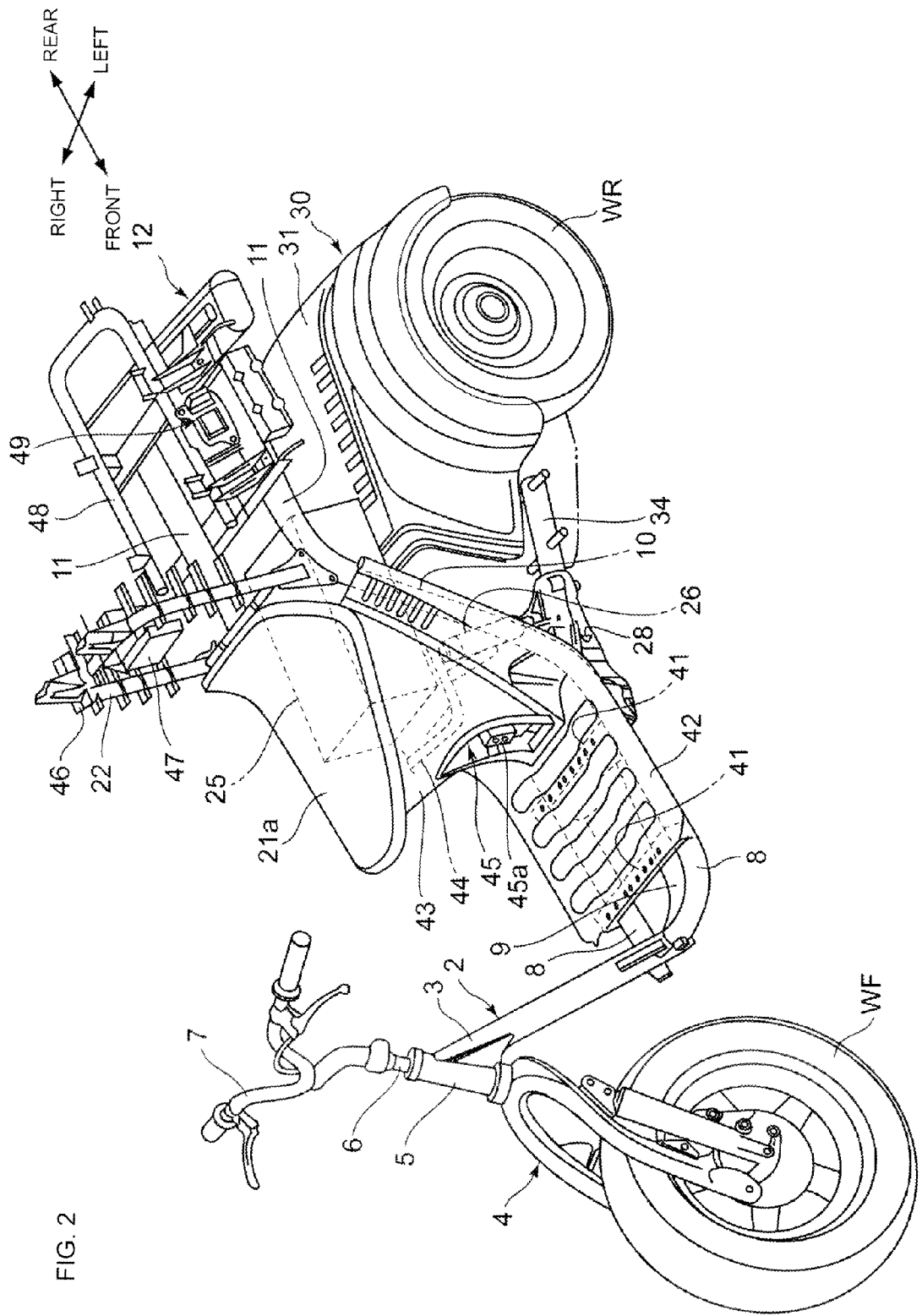
FIG. 2 is a perspective view of the electric three-wheeled vehicle with main exterior parts removed.
Figure 3:
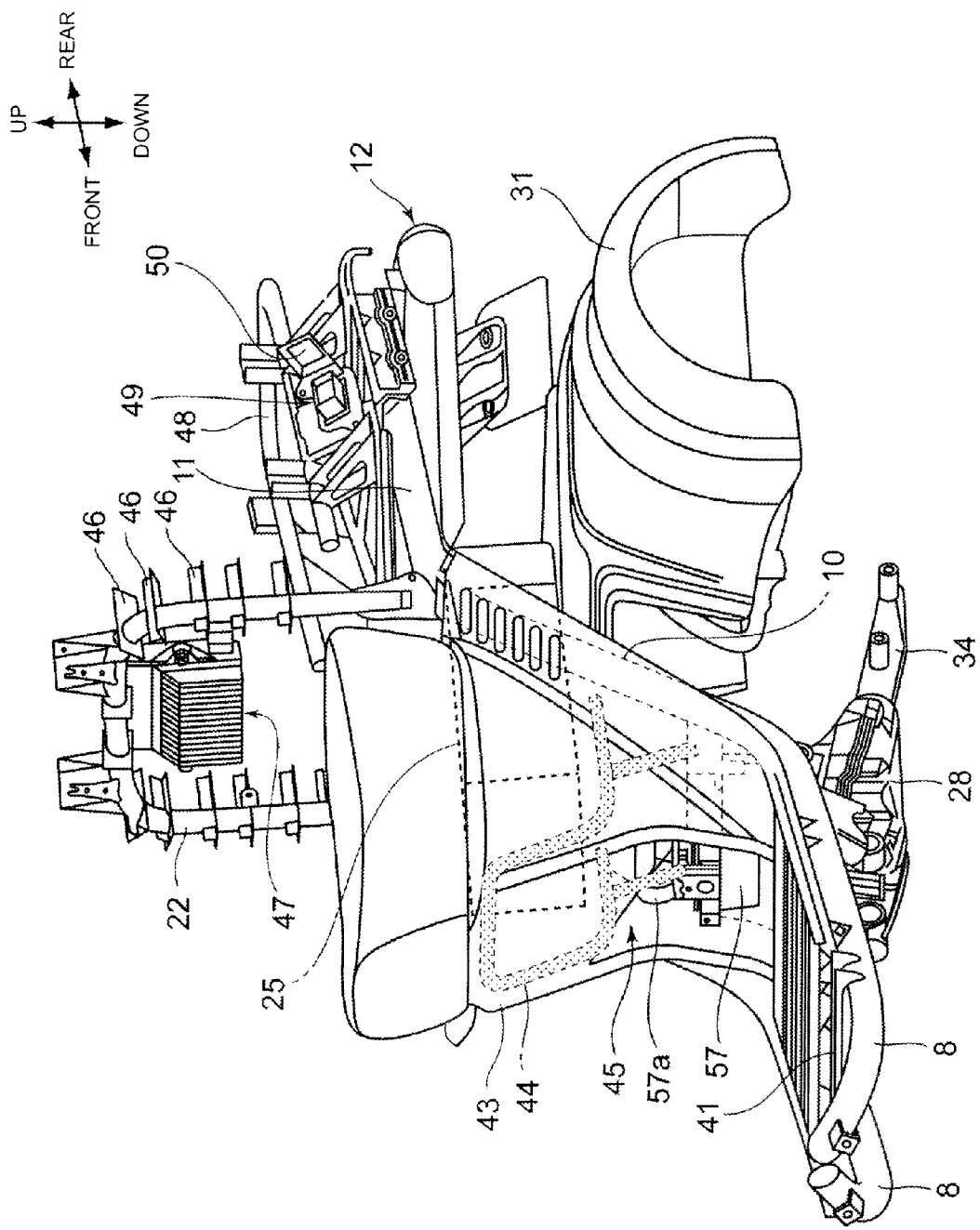
FIG. 3 is a perspective view of the electric three-wheeled vehicle shown in FIG. 2 as seen from a forward position of the vehicle.

FIG. 2 is a perspective view of the electric three-wheeled vehicle 1 with main exterior parts removed. FIG. 3 is a perspective view of the electric three-wheeled vehicle 1 shown in FIG. 2 as seen from a forward position of the vehicle. The same reference signs as the above denote the same or equivalent elements. Two supporting members 41 for supporting a foot rest floor 42 are located on the upper faces of the pair of left and right side frames 8 joined to the main frame 3 along the vehicle transverse direction. A seat cowl 43 for supporting the bottom plate 21a of the seat 21 is attached to the rear of the foot rest floor 42.

An opening 45 which is closed by an openable/closable cover member (not shown) is formed on the vehicle forward side of the seat cowl 43. A low-voltage battery 57 which supplies power to lamp units, etc. is located inside the opening 45. Inside the opening 45, a charge port 45a for charging the high-voltage battery 25 by an external power supply may be located above the low-voltage battery 57. This arrangement makes it possible to access both the charge port 45a and the low-voltage battery 57 only by opening the cover member on the opening 45.

The low-voltage battery 57 is held by a battery stay 57a joined to the standing frames 10. A battery box supporting frame 44 which surrounds the front and bottom of the battery 25 is located inside the seat cowl 43. The battery 25 is housed in a battery box 25a as a bottomed boxy vessel and the battery box 25a is fixed on the battery box supporting frame 44.

A down regulator 47 is suspended from, and fixed to, the upper pipe portion of the supporting frame 22, connected between the standing frames 10 and the rear frames 11, which is oriented along the vehicle transverse direction. Consequently the supporting frame 22 for supporting a backrest for an occupant and a roof member can be effectively used to install the down regulator 47 in a place for effective heat radiation.

A plurality of plate-like reinforcing plates 46 oriented along the vehicle longitudinal direction are attached to the supporting frame 22 so that even if an exterior plate (not shown) as a backrest is provided on the vehicle forward side of the supporting frame 22, the exterior plate is prevented from deforming due to an external force, in order to maintain the heat radiation efficiency of the down regulator 47. A reinforcing frame 48 for the trunk 20 and a battery charge port 49 with an openable/closable cover 50 may be provided above the rear frames 11.

Figure 4:
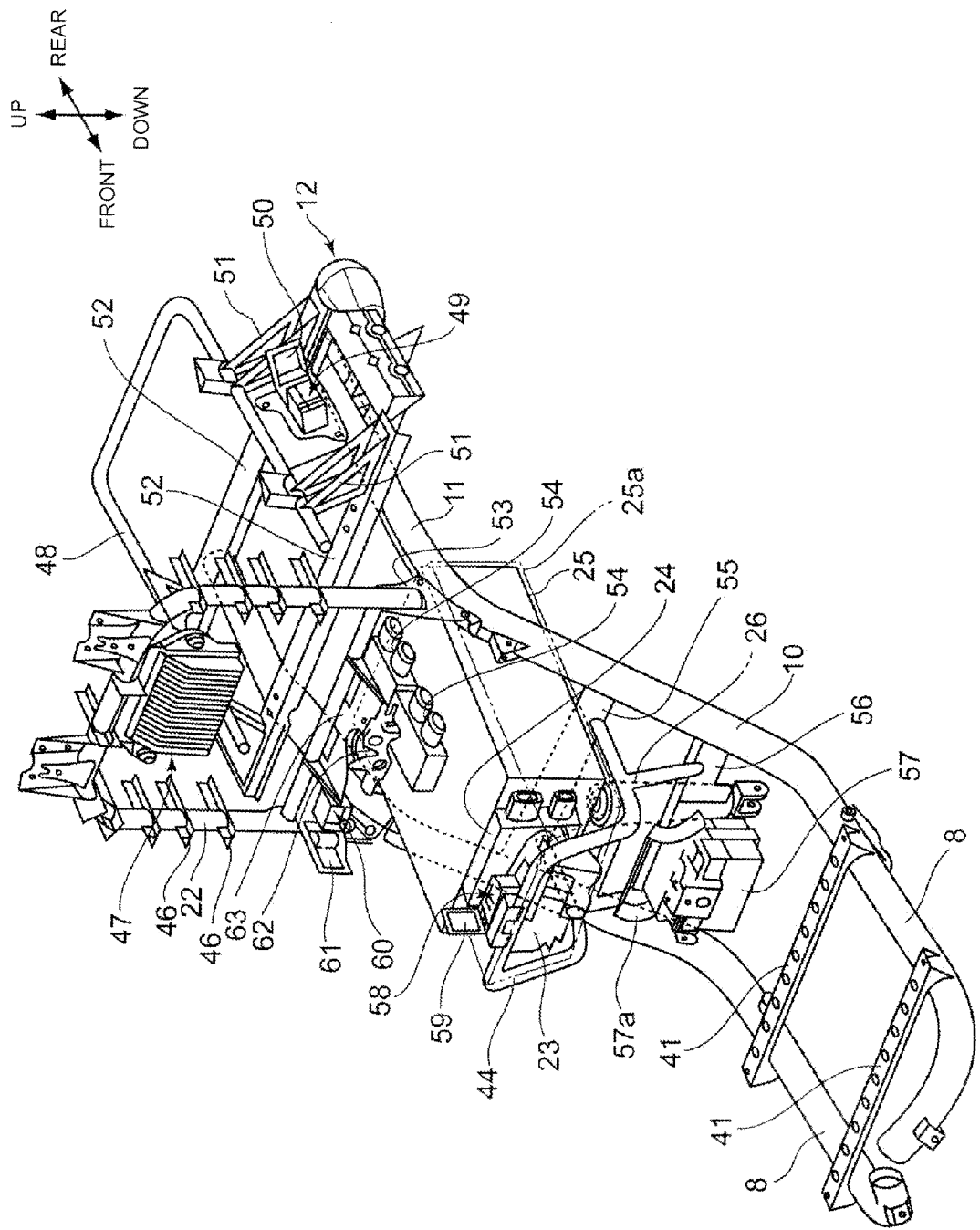
FIG. 4 is a perspective view of the body frame structure around a battery.

FIG. 4 is a perspective view of the body frame structure around the battery 25. The same reference signs as the above denote the same or equivalent elements. The pair of left and right standing frames 10 is transversely connected by an upper cross pipe 55 and a lower cross pipe 56 which are oriented along the vehicle transverse direction. The upper end of the rear shock unit 26 is supported by the upper cross pipe 55. Also the battery stay 57a is fixed on the lower cross pipe 56.

The battery box supporting frame 44 is joined to the front face of the upper cross pipe 55 and the oblique upper face of the lower cross pipe 56. The battery box supporting frame 44 is so formed as to extend toward the vehicle forward direction of the battery box 25a, then bend upward, and the battery box 25a is fixed above the upper cross pipe 55 in a way that its front side is covered by the battery box supporting frame 44.

The BMU 24 and contactor 23 are located between the front side of the battery 25 and the battery box supporting frame 44. The BMU 24 has a function to collect information from a monitoring board 54 (see FIG. 4) for monitoring the state of the battery 25 and the contactor 23 is an electric component which has a function to open and close the connection between the drive circuit for driving the motor M and the battery 25. In this embodiment, the BMU 24 and contactor 23 are also housed in the battery box 25a and in front of the battery 25.

A charge port 49 with an openable/closable cover 59 may be provided above the contactor 23. According to this constitution, it is possible to access the charge port 49 only by opening the openable/closable seat 21.

Two monitoring boards 54 for monitoring the state of the battery 25 are located on the upper surface of the battery 25. The supporting frame 22 is fixed through gussets 53 welded upright to the upper portions of the standing frames 10 and a supporting stay 63 for supporting a seat catch 62 is fitted between the left and right pipes of the supporting frame 22. The seat catch 62 has a function to hold the openable/closable seat 21 closed.

A charge port 60 with an openable/closable cover 61 may be located on the right of the seat catch 62 in the vehicle transverse direction and inside the supporting frame 22. According to this constitution, it is possible to provide a charge port in a high position of the vehicle using the supporting frame 22 to facilitate charging work. The electric three-wheeled vehicle 1 should have at least one charge port. For example, the reinforcing frame 48 for the trunk 20 is supported by supporting members 51 erected from two cross frames 52 oriented along the vehicle transverse direction and functions as a stay for the battery charge port 49 with an openable/closable cover 50; however, the reinforcing frame 48, cross frames 52 and charge port 49 may be omitted in the electric three-wheeled vehicle 1.

Figure 10:
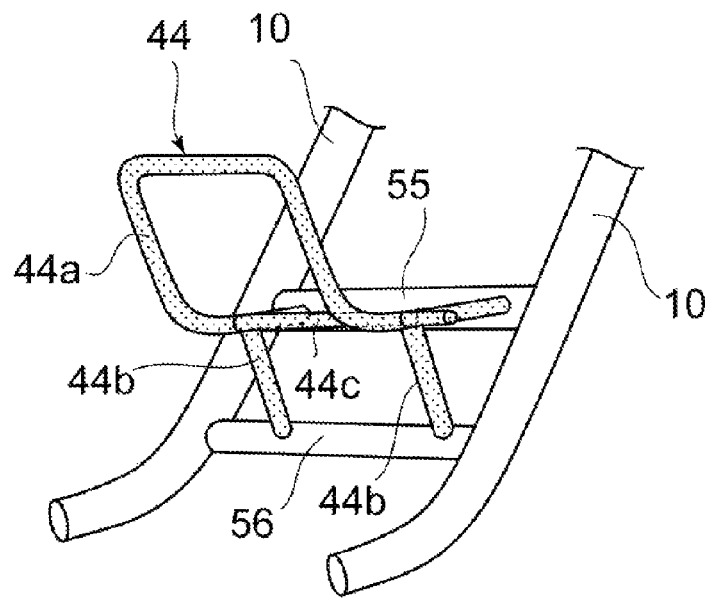
FIG. 10 is a perspective view of a battery box supporting frame.

Here, the supporting structure for the battery box 25a will be described referring to FIGS. 10 to 13. FIG. 10 is a perspective view of the battery box supporting frame 44. The battery box supporting frame 44 is comprised of a main pipe 44a joined to the upper cross pipe 55 and shaped to surround the front of the battery box 25a, a pair of left and right reinforcing pipes 44b extending downward from the lower parts of the main pipe 44a in the vehicle rearward direction and connected to the lower cross pipe 56, and a cross member 44c extending in the vehicle transverse direction and connecting the upper parts of the left and right reinforcing pipes 44b.

Figure 11:
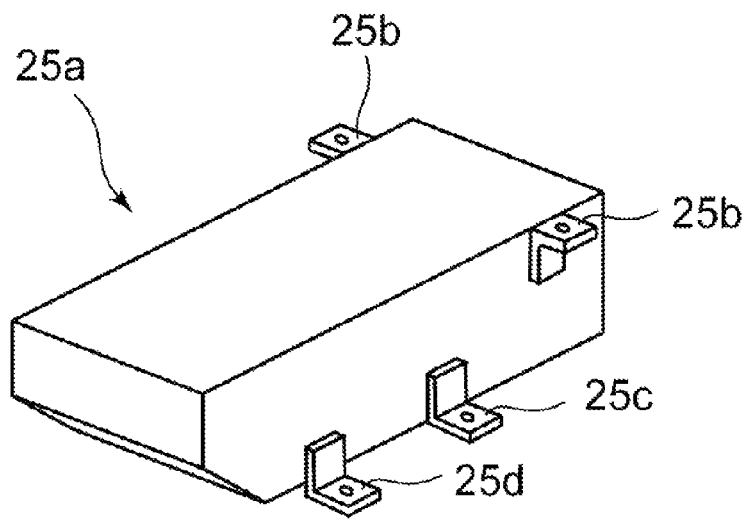
FIG. 11 is a perspective view of a battery box.

FIG. 11 is a perspective view of the battery box 25a. A plurality of mounting stays for fixation to the body frame 2 and battery box supporting frame 44 are provided on the battery box 25a. A pair of left and right front mounting stays 25d which are fixed on the upper surface of the cross member 44c are provided on the front bottom parts of the battery box 25a. Also a pair of left and right central mounting stays 25c which are fixed on the upper surface of the upper cross pipe 55 are provided on the central bottom parts of the battery box 25a. Also, rear mounting stays 25b which are fixed on the lower surfaces of the rear frames 11 are provided on the rear top parts of the battery box 25a.

Figure 12:
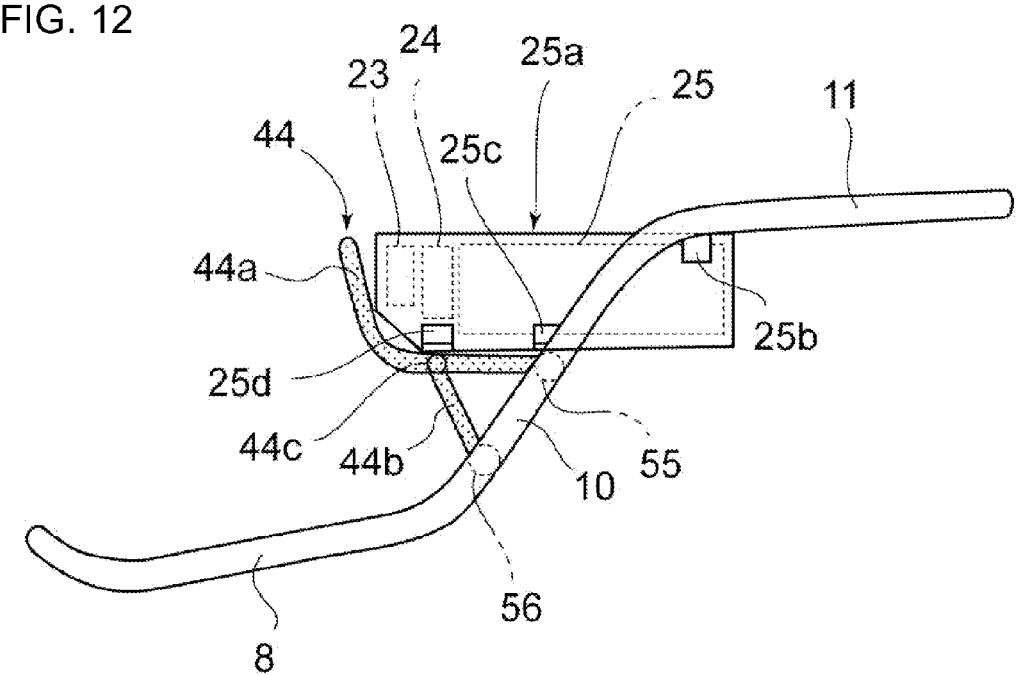
FIG. 12 is a side view of the battery box mounted on the battery box supporting frame.
Figure 13:
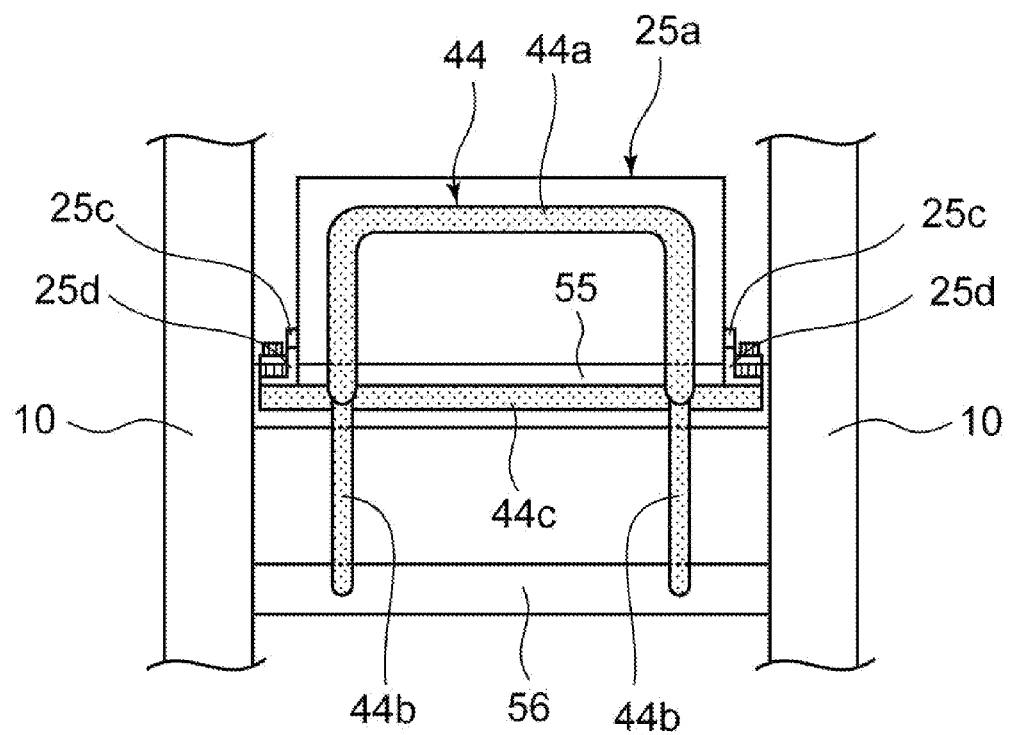
FIG. 13 is a front view of the battery box mounted on the battery box supporting frame.

FIG. 12 is a side view of the battery box 25a mounted on the battery box supporting frame 44. FIG. 13 is a front view thereof. The same reference signs as the above denote the same or equivalent elements. The battery box 25a according to this embodiment is fixed on the body frame 2 with a total of six mounting stays. Specifically, the battery box 25a is fixed on the cross member 44c of the battery box supporting frame 44 with the front mounting stays 25d and fastening members such as bolts and also fixed on the upper cross pipe 55 with the central mounting stays 25c, and further fixed on the rear frames 11 with the rear mounting stays 25b. Consequently, even when the battery box 25c is located in a way to considerably protrude from the standing frames 10 toward the vehicle rearward direction, the battery box 25c can be fixed stably.

Figure 14:
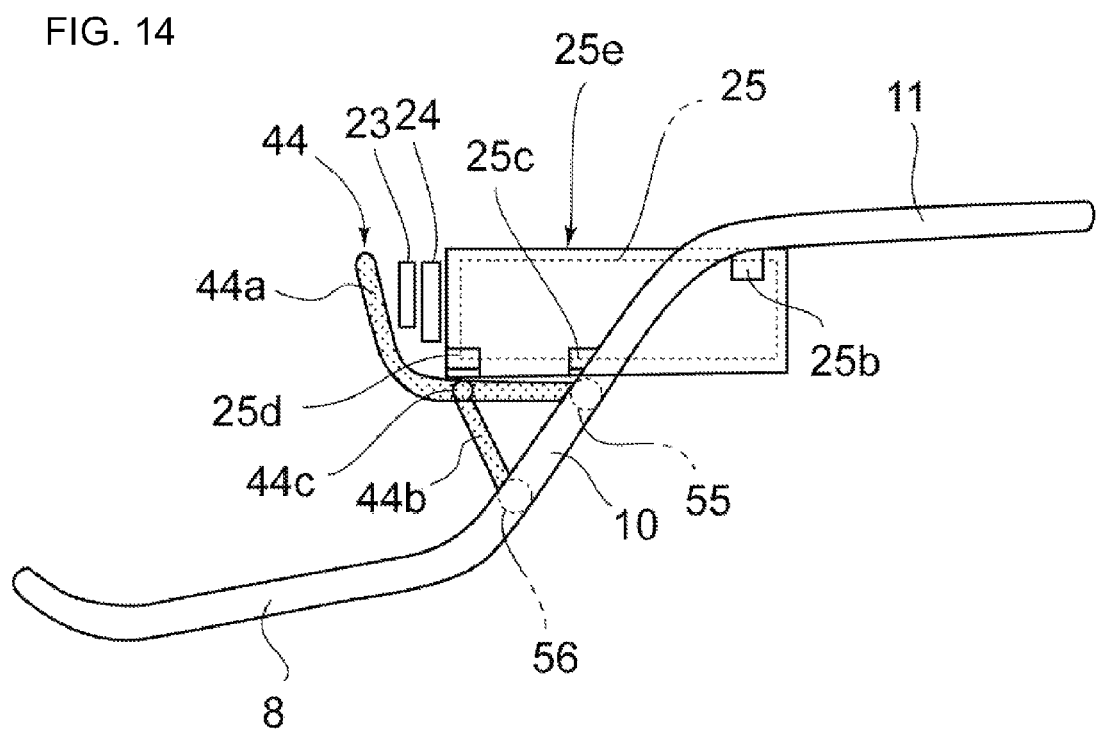
FIG. 14 is a side view of a battery box according to another embodiment.

FIG. 14 is a side view of a battery box 25e according to a variation of this embodiment. The same reference signs as the above denote the same or equivalent elements. In this variation, while the battery box 25e, virtually a rectangular parallelepiped, houses the battery 25, the contactor 23 and BMU 24 are located in front of the battery box 25e in a way to be surrounded by the main pipe 44a of the battery box supporting frame 44. The contactor 23 and BMU 24 may be fixed on the main pipe 44a. The battery box 25e is fixed on the cross member 44c with the front mounting stays 25d and fastening members such as bolts and also fixed on the upper cross pipe 55 with the central mounting stays 25c, and further fixed on the rear frames 11 with the rear mounting stays 25b. The shapes of the battery box and mounting stays and the locations of the mounting stays may be modified in various ways.

Figure 5:
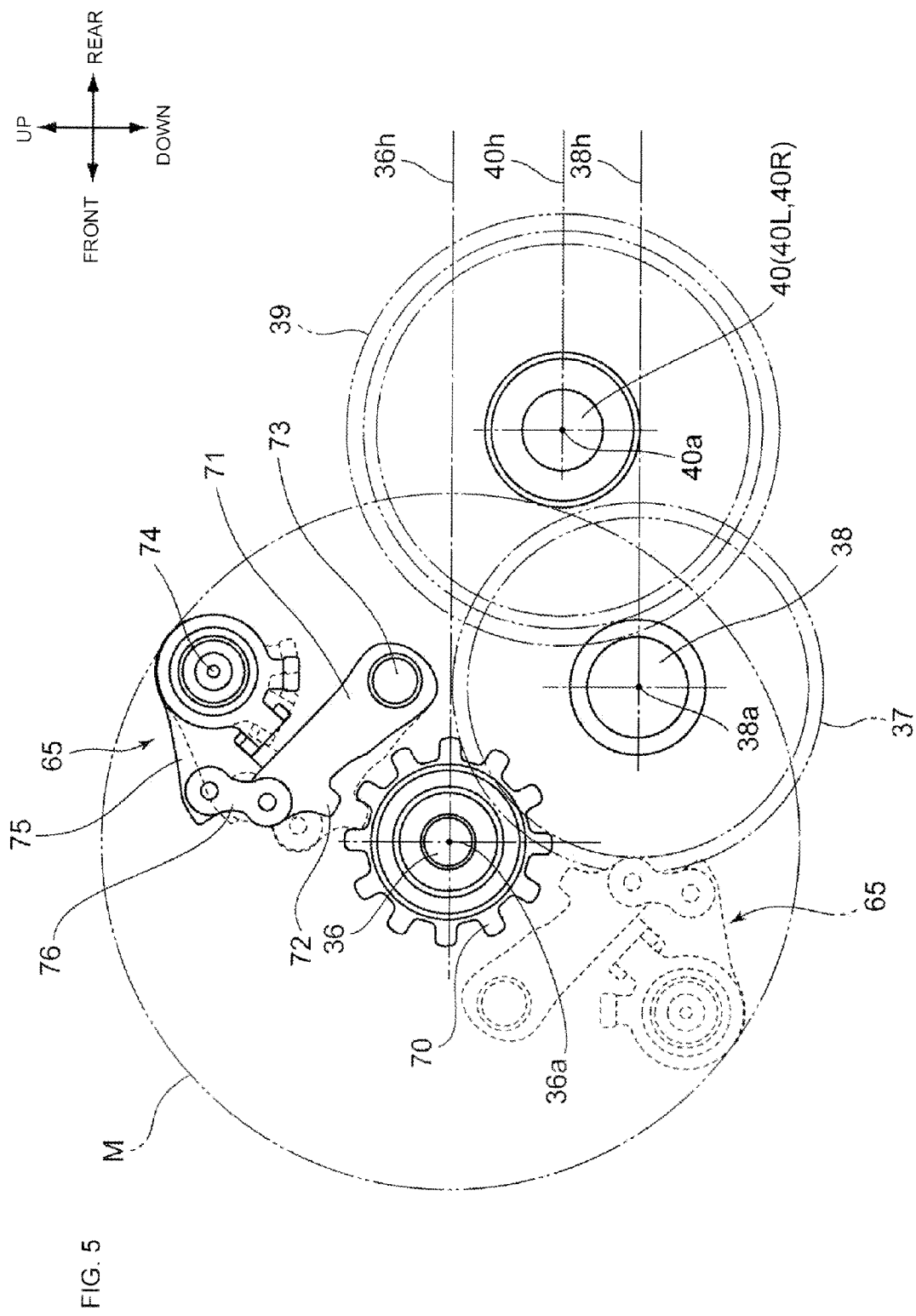
FIG. 5 is a side view of the vehicle showing the arrangement of main axes in the power unit.

FIG. 5 is a side view of the vehicle body showing the arrangement of main axes of the power unit P. The power unit P according to this embodiment is structured so as to transmit the rotary driving power of the motor M to the axle 40 (40L, 40R) through the counter shaft 38. At this time, when axis center 36a is the axis center of the motor output shaft 36 of the motor M, axis center 38a is the axis center of the counter shaft 38, and axis center 40a is the axis center of the axle 40, the axis center 36a, axis center 38a, and axis center 40a are arranged in the order of mention from the vehicle forward side in the vehicle longitudinal direction.

In the vehicle longitudinal direction, as indicated by horizontal lines 36h, 38h, and 40h passing through the axis centers 36a, 38a, and 40a, the axis centers 36a, 40a, and 38a are arranged in the order of mention from the vehicle upper direction. In other words, in the vehicle longitudinal direction, the axis center 38a of the counter shaft 38 is located between the axis center 36a of the motor output shaft 36 and the axis center 40a of the axle 40. Also, the axis center 38a of the counter shaft 38 is located below the line L connecting the axis center 36a of the motor output shaft 36 and the axis center 40a of the axle 40. Consequently, the distance between the motor output shaft 36 and the axle 40 in the vehicle longitudinal direction can be as short as possible so that the dimension of the power unit P in the vehicle longitudinal direction is decreased.

According to the above constitution, for example, the dimension in the vehicle longitudinal direction can be smaller than in a constitution that the motor output shaft, counter shaft and axle are arranged in a row in the vehicle longitudinal direction. In addition, it is possible to arrange so that no components exist on the vehicle rearward side of the motor M except the axle 40, making it possible to increase the outside diameter of the motor without interfering with the axle 40.

Consequently, by making the outside diameter of the motor M close to the axle 40 to the extent that it does not interfere with the axle 40, the motor output power can be increased with the enlargement of the motor outside diameter, which means that the dimension of the motor in its thickness direction can be decreased and the dimension of the power unit in the vehicle transverse direction can be decreased. In addition, since a centrifugal clutch 80 is provided coaxially with the motor, the torque of the motor M can be efficiently transmitted to the rear wheels WR at low revolution speed.

Also the power unit P has a parking lock mechanism 65 to prevent the rear wheels WR from rotating during a stop on a slope or the like. The parking lock works when the protrusion 72 of a lock arm 71 which is swung by manual operation is engaged with a lock gear 70 fixed on the motor output shaft 36.

Regarding the lock arm 71, which can swing around a spindle 73, its protrusion 72 is away from the lock gear 70 when the parking lock is released. As the occupant operates a parking lock operating lever (not shown) located near the steering handlebar 4, etc., a swing arm 75 which swings around a swing shaft 74 rotates counterclockwise and a link member 76 rotates the lock arm 71 counterclockwise to enable the protrusion 72 of the lock arm 71 to engage with the lock gear 70 (indicated by broken line in the drawing).

As mentioned above, in the power unit P according to this embodiment, the counter shaft 38 is located below the motor output shaft 36 and axle 40, so the parking lock mechanism 65 can be located in the space reserved above it, thereby making it possible that the whole power unit P including the parking lock mechanism 65 is compact. As indicated by the broken line in the drawing, the parking lock mechanism 65 can be located below the motor output shaft 36 and counter shaft 38.

Figure 6:
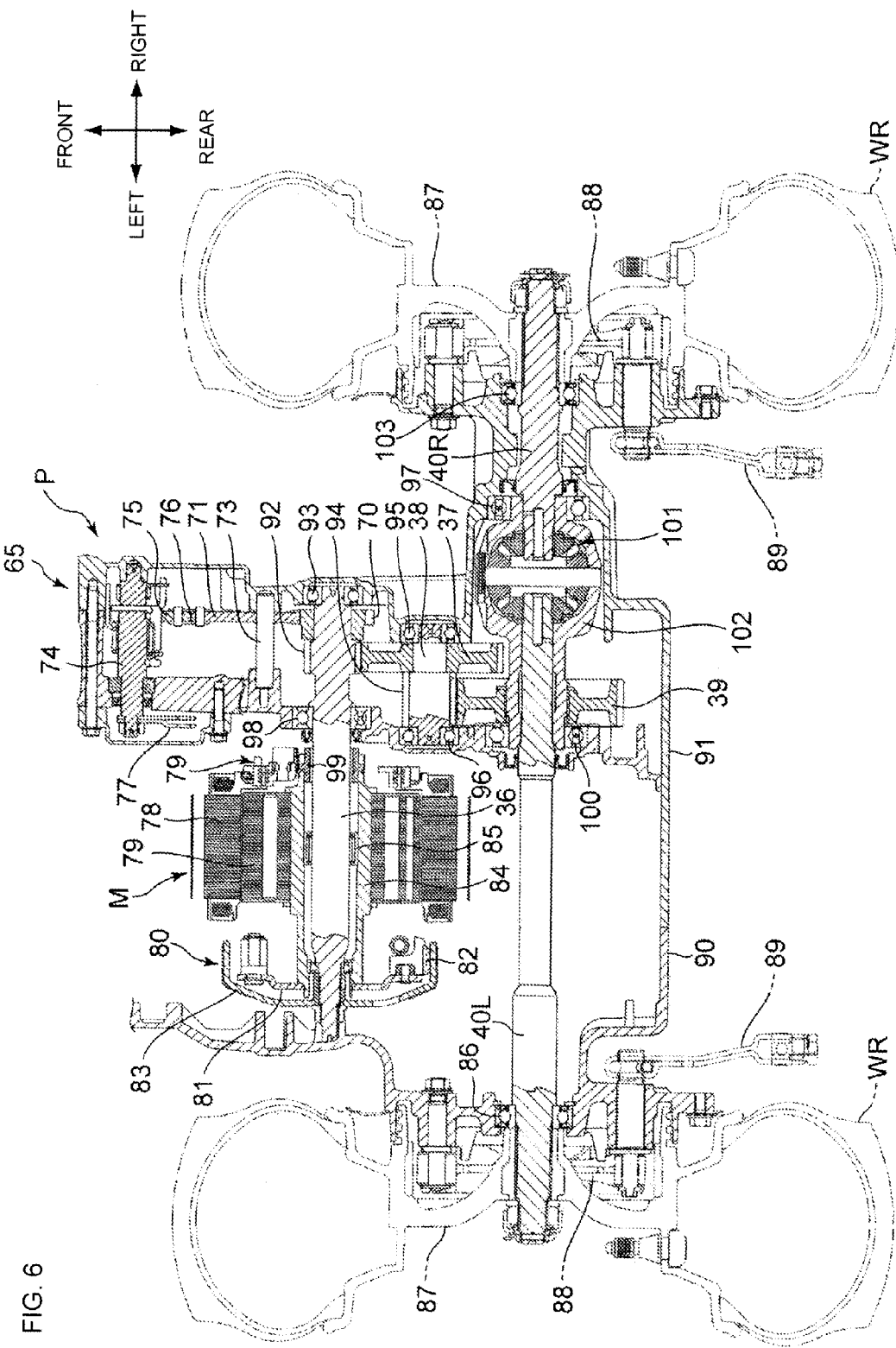
FIG. 6 is a sectional plan view of the power unit according to an embodiment.
Figure 7:
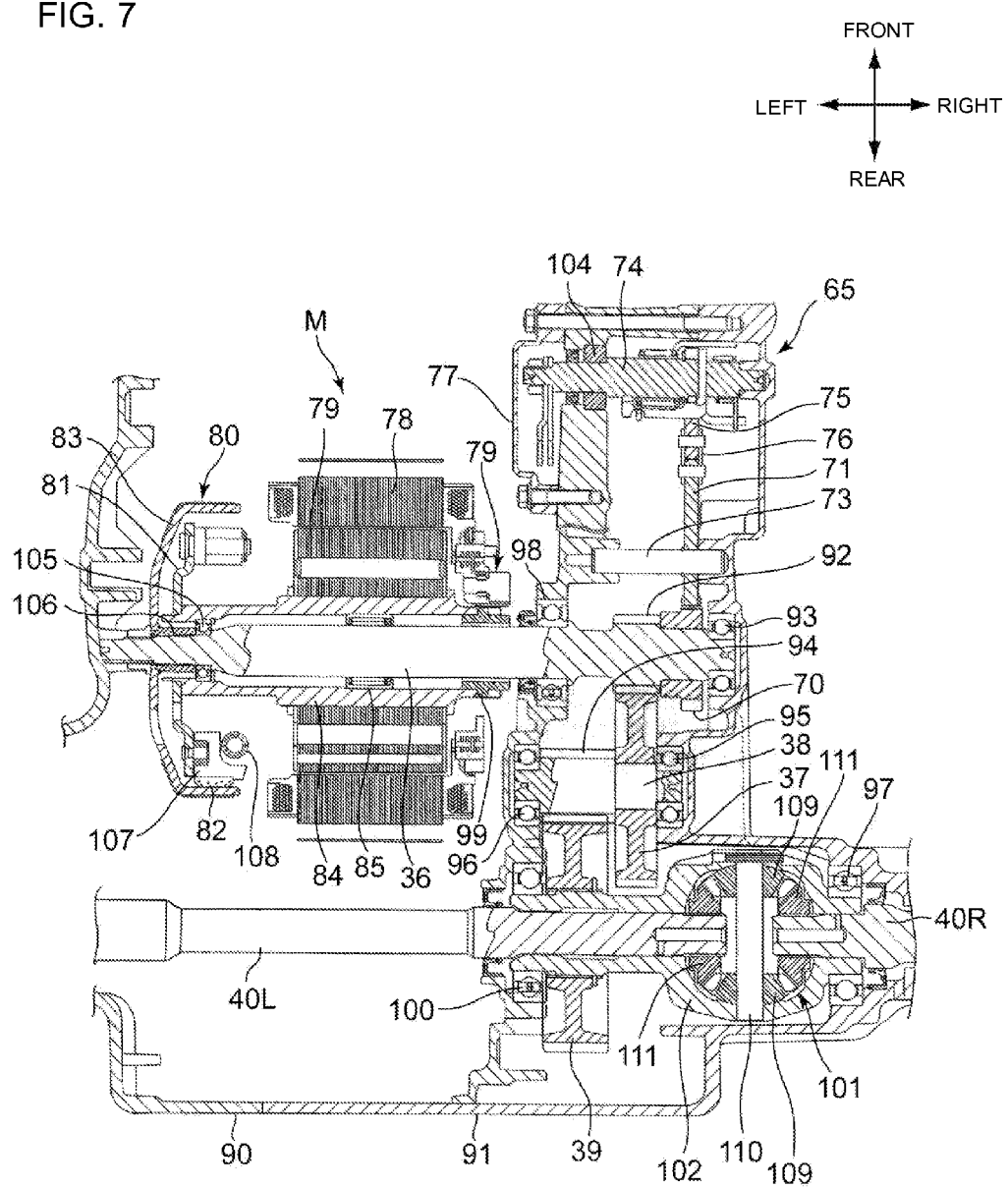
FIG. 7 is a fragmentary enlarged view of FIG. 6.

FIG. 6 is a sectional plan view of the power unit P according to this embodiment. FIG. 7 is a fragmentary enlarged view of FIG. 6. The power unit P is so structured as to transmit the rotary driving power of the motor M to the differential mechanism 101 of the rear wheels WR through the centrifugal clutch 80 and counter shaft 38. The power unit P does not have a transmission and is structured so that when the revolution speed (the number of rotations) of the motor M exceeds a prescribed value, transmission of power to the rear wheels WR begins and the vehicle speed increases in proportion to the revolution speed of the motor M.

The inner rotor motor M is comprised of a stator 78 fixed on a right case 91 and a rotor 79 fixed on an outer motor output shaft 84 located outside the motor output shaft 36. The motor M can have a large outside diameter to the extent that it does not interfere with the axle 40, because there are no other gears, etc. on the vehicle forward and rearward sides thereof. The outer motor output shaft 84 is journaled to the motor output shaft 96 by bearings 85 and 105 in a rotatable manner.

The centrifugal clutch 80 is located at the left end of the motor output shaft 36 as seen in the drawing. While a disc clutch inner 81 is fixed at the left end of the outer motor output shaft 84 as seen in the drawing, a bottomed cylindrical clutch outer 83 is fixed through a fixing member 106 at the left end of the motor output shaft 36 as seen in the drawing.

When the revolution speed of the motor M exceeds a prescribed value, or the revolution speed of the clutch inner 81 exceeds a prescribed value, a plurality of weight rollers 108 move outward in the radial direction by a centrifugal force. In response, a clutch shoe 107 having a friction material 82 touches the clutch outer 83 and the rotary driving power of the clutch inner 81 is transmitted to the clutch outer 83. An object to be sensed 99, a magnet, is provided at the right end of the outer motor output shaft 84 as seen in the drawing for a motor revolution speed sensor 79 to detect the motor revolution speed.

The motor output shaft 36 is journaled to bearings 98 and 93 of the right case 91 on the right as seen in the drawing. The rotary driving power of the motor output shaft 36 is transmitted to the counter shaft 38 through the counter gear 37 engaged with a gear 92 formed on the motor output shaft 36. The rotary driving power of the counter shaft 38 pivotally supported by the bearings 95 and 96 is transmitted to the differential case 102 of the differential mechanism 101 through an output gear 39 engaged with a gear 94 formed on the counter shaft 38.

According to the above constitution, power transmission from the motor output shaft 36 to the axle 40 can be achieved by a smaller number of components and a simple constitution. Also, the length of the counter shaft 38 can be decreased.

The lock gear 70 of the parking lock mechanism 65 is fixed at the right end of the motor output shaft 36 as seen in the drawing. The lock arm 71 is welded to a spindle 73 and pivotally supported in a way that the spindle 73 can rotate with respect to the case part. A swing arm 75 which is engaged with the lock arm 71 through a link member 76 is fixed on a swing shaft 74 pivotally supported by a bearing 104. A working arm 77 which is connected with an operating wire (not shown) is fixed at the left end of the swing shaft 74 as seen in the drawing.

The differential case 102 is pivotally supported by bearings 97 and 100 of the right case 91. The differential mechanism 101 has a pair of pinion gears 109 pivotally supported by a pin 110 and a pair of side gears 111 in the vehicle transverse direction, in which a left axle 40L and a right axle 40R are spline-fitted to the respective side gears 111.

The counter gear 37 and differential case 102 are located so as to overlap each other in a side view of the vehicle in order to make the counter shaft 38 and the differential case 102 as close to each other as possible and reduce the dimension of the power unit P in the vehicle longitudinal direction.

While the left axle 40L is journaled to a bearing 86 of the left case 90 and fixed on a wheel 87, the right axle 40R is journaled to a bearing 103 of the right case 91 and fixed on a wheel 87. A brake shoe 88 which is activated according to a brake arm 89 to be swung by a wire, etc. is housed in both the wheels 87.

In the power unit P according to this embodiment, the centrifugal clutch 80, motor M, counter shaft 38, and differential mechanism 101 are distributively arranged in the order of mention from the left in the vehicle transverse direction in a plan view of the vehicle so that the motor M with a large outside diameter and the differential mechanism 101 are located on the left and right sides of the counter shaft 38 to make the distance between the motor output shaft 36 and the axle 40 shorter.

Figure 8:
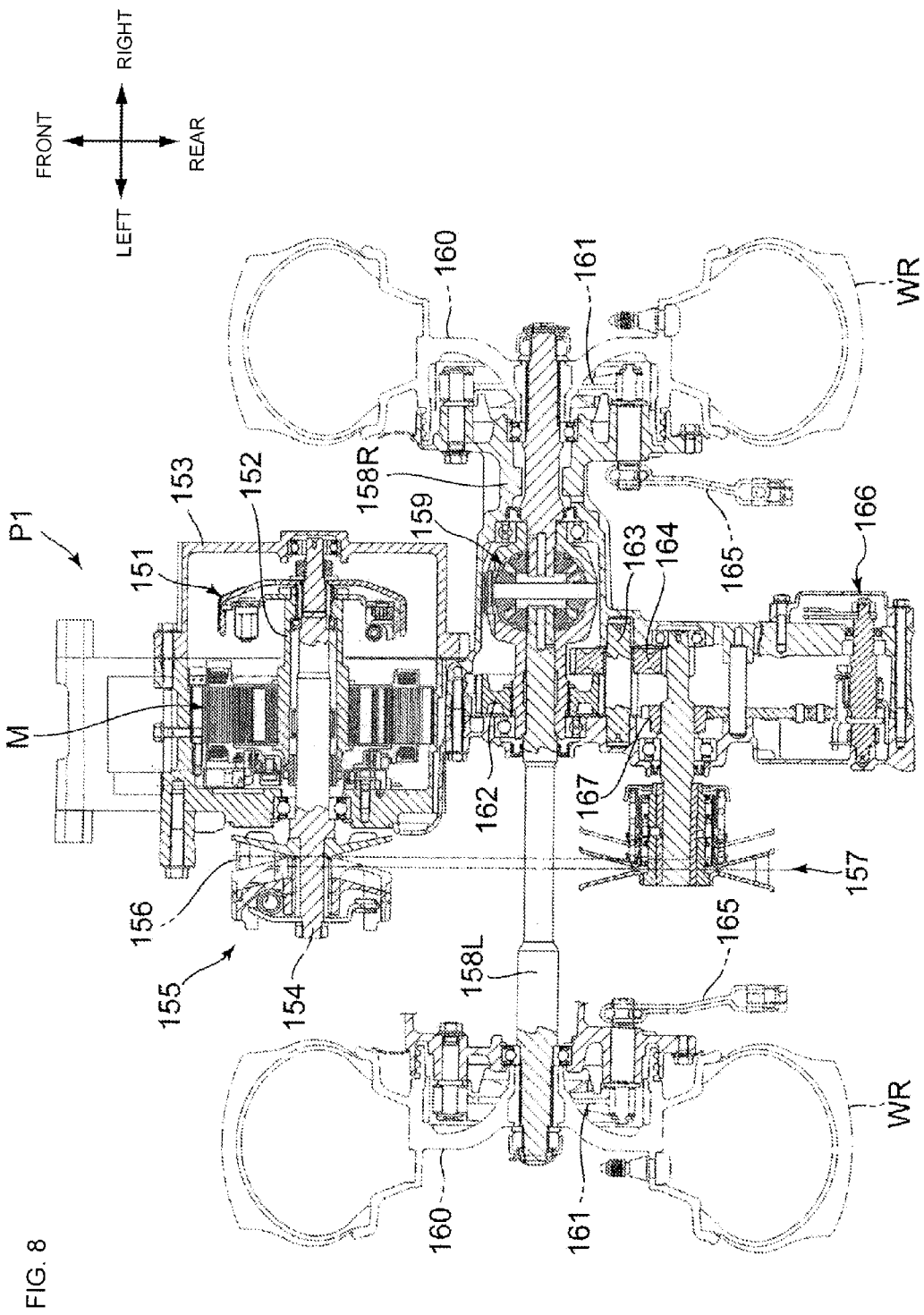
FIG. 8 is a sectional plan view of a power unit according to another embodiment of the present invention.
Figure 9:
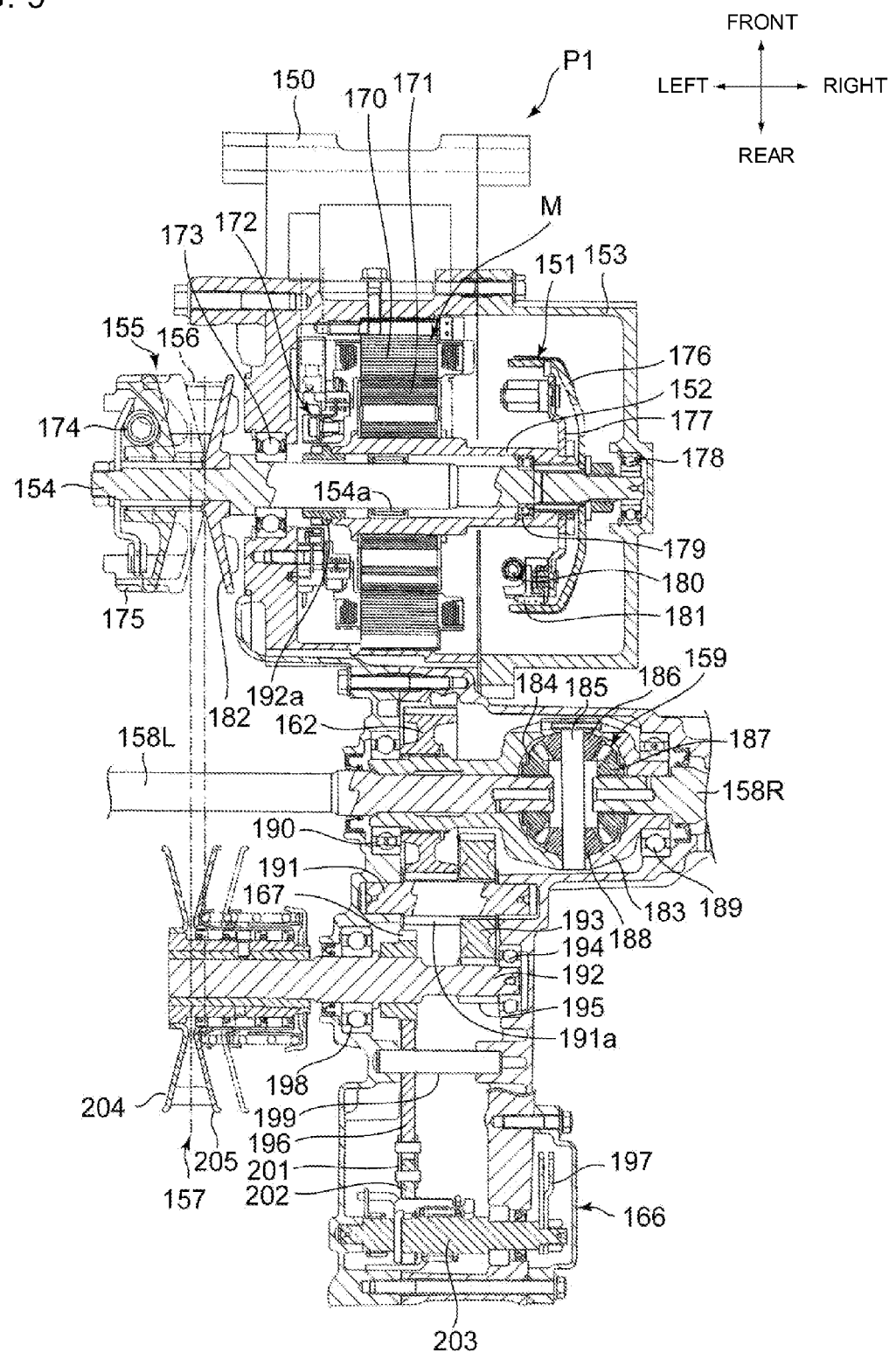
FIG. 9 is a fragmentary enlarged view of FIG. 8.

FIG. 8 is a sectional plan view of a power unit P1 according to a second embodiment of the present invention. FIG. 9 is a fragmentary enlarged view of FIG. 8. The power unit P1 is so structured as to transmit the rotary driving power of the motor M to the differential mechanism 159 of the rear wheels WR through a centrifugal clutch 151, a belt converter type continuously variable transmission, and a counter shaft 163.

The inner rotor motor M is comprised of a stator 170 fixed on a case 150 and a rotor 171 fixed on an outer motor output shaft 152. The outer motor output shaft 152 is pivotally supported on the motor output shaft 154 by bearings 154a and 179 in a rotatable manner. While a disc clutch inner 177 is fixed at the right end of the outer motor output shaft 152 as seen in the drawing, a bottomed cylindrical clutch outer 176 is fixed at the right end of the motor output shaft 154 as seen in the drawing.

When the revolution speed of the motor M exceeds a prescribed value, or the revolution speed of the clutch inner 177 exceeds a prescribed value, a plurality of weight rollers 180 move outward in the radial direction by a centrifugal force and in response, a clutch shoe 181 having a friction material touches the clutch outer 176. Consequently, the rotary driving power of the clutch inner 177 is transmitted to the clutch outer 176. An object to be sensed 172a, a magnet, is provided at the left end of the outer motor output shaft 152 as seen in the drawing for a motor revolution speed sensor 172 to detect the motor revolution speed.

The motor output shaft 154 is journaled to a bearing 173 of a housing 150 on the left as seen in the drawing and also journaled to a bearing 178 of a clutch case 153 at the right end as seen in the drawing. A driving variable speed pulley 155 comprised of a fixed pulley half 182 and a movable pulley half 175 is attached to the left end of the motor output shaft 154 as seen in the drawing. As a weight roller 174 moves in the radial direction according to the revolution speed of the motor output shaft 154, the driving variable speed pulley 155 changes the winding diameter of an endless V belt 156 wound between it and a driven pulley 157.

The driven pulley 157 around which the V belt 156 is wound is attached to a driven shaft 192. The driven pulley 157 is comprised of a fixed pulley half 204 and a movable pulley half 205 and changes its winding diameter according to the winding diameter of the driving variable speed pulley 155 to change the revolution speed of the motor output shaft 154 at a given gear ratio and transmit it to a driven shaft 192. The driven shaft 192 is journaled to bearings 194 and 198 of the case 150.

The rotary driving power of the driven shaft 192 is transmitted to the counter shaft 191 through the counter gear 193 engaged with a gear 196 formed on the driven shaft 192. The rotary driving power of the counter shaft 191 is transmitted to the differential case 183 of the differential mechanism 159 through an output gear 162 engaged with a gear 191*a* formed on the counter shaft 191.

A lock gear 167 for a parking lock mechanism 166 is fixed on the driven shaft 192. The lock arm 196 is welded to a spindle 199 and engaged in a way that the spindle 199 can rotate with respect to the case part. A swing arm 202 which is engaged with the lock arm 196 through a link member 201 is fixed on a swing shaft 203. A working arm 197 which is connected with an operating wire end is fixed at the right end of the swing shaft 203 as seen in the drawing.

The differential case 183 is pivotally supported by bearings 189 and 190 of the case part. The differential mechanism 159 has a pair of pinion gears 186 and 188 pivotally supported by a pin 185 and a pair of side gears 184 and 187 in the vehicle transverse direction, in which a left axle 158L and a right axle 158R are spline-fitted to the respective side gears 184 and 187. While the left axle 158L is fixed on a left wheel 160, the right axle 158R is fixed on a right wheel 160. A brake shoe 161 which is activated according to a brake arm 165 to be swung by a wire, etc. is housed in both the wheels 160.

The electric three-wheeled vehicle structure, the axial arrangement of main axes of the power unit of the rear body, and the arrangement of electric components such as the battery and PDU are not limited to the above embodiments and may be modified in various ways.

REFERENCE SIGNS LIST

1 . . . Electric three-wheeled vehicle
2 . . . Body frame
3 . . . Main frame
8 . . . Side frame
10 . . . Standing frame
11 . . . Rear frame
21 . . . Seat
22 . . . Supporting frame
23 . . . Contactor
24 . . . BMU
25 . . . Battery
26 . . . Rear shock unit
27 . . . Pivot shaft
28 . . . Vertical swing unit
33 . . . PDU
34 . . . Tilting member
36 . . . Motor output shaft
38 . . . Counter shaft
40 (40L, 40R) . . . Axle
44 . . . Battery box supporting frame
45*a*, 49, 58, 60 . . . Charge port
47 . . . Down regulator
55 . . . Upper cross pipe
56 . . . Lower cross pipe
57 . . . Low-voltage battery
65 . . . Parking lock mechanism
70 . . . Lock gear
80 . . . Centrifugal clutch
101 . . . Differential mechanism
102 . . . Differential case
M . . . Motor
P . . . Power unit
R . . . Rear wheel

The invention claimed is:

1. An electric vehicle, comprising:
a pair of left and right rear wheels configured to be driven by rotary driving power;
a motor supplied with electric power from a battery, and to provide the rotary driving power;
a rear body configured to support the motor and the rear wheels, said rear body being attached at a back of a body frame in a vertically swingable and transversely tiltable manner;
a motor output shaft configured to transmit the rotary driving power to axles of the rear wheels through a counter shaft;
a centrifugal clutch configured to transmit the rotary driving power to the counter shaft when a revolution speed of the motor exceeds a prescribed value, said centrifugal clutch being coaxially located at one end of the motor output shaft; and
a differential case housing a differential mechanism therein, the differential case configured to be coaxial with the axles of the rear wheels,
wherein the counter shaft is located inside an outer periphery of the motor in a side view of the vehicle,
wherein the motor output shaft, the counter shaft, and the axles are configured in order of the motor output shaft, the counter shaft, and the axles from a vehicle forward side in a side view of the vehicle,
wherein an axis center of the counter shaft is located below a line connecting an axis center of the motor output shaft and an axis center of the axle in the side view of the vehicle,
wherein a counter gear is fixed on the counter shaft and an output gear is arranged coaxially with the axles,
wherein the motor, counter gear and output gear are each configured to at least partially overlap each other in the side view of the vehicle,
wherein the counter gear and the differential case are configured to overlap each other in the side view of the vehicle, and
wherein the motor, motor output shaft, counter shaft, counter gear and output gear are each configured to be entirely disposed on a side of a center line through the differential mechanism, the center line being perpendicular to the axles of the rear wheels.

2. The electric vehicle according to claim 1, wherein the outer periphery of the motor and an outer periphery of the axle are adjacent each other.

3. The electric vehicle according to claim 1, wherein the motor is configured such that after the rotary driving power is transmitted from a first gear disposed at one end of the motor output shaft to the counter gear engaged with the gear and fixed on the counter shaft, the rotary driving power is transmitted from a second gear formed at one end of the counter shaft to the output gear engaged with the second gear and fixed on the differential case housing the differential mechanism.

4. The electric vehicle according to claim 1, wherein the centrifugal clutch, the motor, the counter shaft, and the differential mechanism are configured from left in a vehicle transverse direction in a plan view of the vehicle in order of mention.

5. The electric vehicle according to claim 1, further comprising a parking lock mechanism configured to prohibit rotation of the rear wheels,
wherein a lock gear is engaged with a lock arm of the parking lock mechanism, said lock gear being fixed coaxially with the motor output shaft before speed reduction.

6. The electric vehicle according to claim 5, wherein the parking lock mechanism is located above or below the counter shaft in a vehicle vertical direction, and to overlap the motor in the side view of the vehicle.

7. The electric vehicle according to claim 1, wherein said vehicle comprises an electric three-wheeled vehicle.

8. An electric vehicle, comprising:
   a pair of left and right rear wheels for being driven by rotary driving power;
   motor means supplied with electric power from a battery, said motor means for providing the rotary driving power to the left and right rear wheels;
   rear body means for supporting the motor and the rear wheels, said rear body means being attached at a back of a body frame in a vertically swingable and transversely tiltable manner;
   motor output shaft means for transmitting the rotary driving power to axles of the rear wheels through a counter shaft means;
   centrifugal clutch means for transmitting the rotary driving power to the counter shaft means when a revolution speed of the motor means exceeds a prescribed value, said centrifugal clutch means being coaxially located at one end of the motor output shaft means; and
   a differential case housing a differential mechanism therein, the differential case configured to be disposed coaxial to the axles of the rear wheels,
   wherein the counter shaft means is located inside an outer periphery of the motor means in a side view of the vehicle,
   wherein the motor output shaft means, the counter shaft means, and the axles are configured in order of the motor output shaft means, the counter shaft means, and the axles from a vehicle forward side in a side view of the vehicle,
   wherein an axis center of the counter shaft means is located below a line connecting an axis center of the motor output shaft means and axis center of the axle in the side view of the vehicle,
   wherein a counter gear means is fixed on the counter shaft means and an output gear means is arranged coaxially with the axles,
   wherein the motor means, counter gear means and output gear means are each configured to at least partially overlap each other in the side view of the vehicle,
   wherein the counter gear means and the differential case are configured to overlap each other in the side view of the vehicle, and
   wherein the motor means, motor output shaft means, counter shaft means, counter gear means and output gear means are each configured to be entirely disposed on a side of a center line through the differential mechanism, the center line being perpendicular to the axles of the rear wheels.

9. The electric vehicle according to claim 8, wherein the outer periphery of the motor means and an outer periphery of the axle are adjacent each other.

10. The electric vehicle according to claim 8, wherein the motor means is also for transmitting the rotary driving power from a first gear disposed at one end of the motor output shaft means to the counter gear means engaged with the gear and fixed on the counter shaft means, and wherein the rotary driving power is transmitted from a second gear formed at one end of the counter shaft means to the output gear means engaged with the second gear and fixed on the differential case housing the differential mechanism.

11. The electric vehicle according to claim 8, wherein the centrifugal clutch means, the motor means, the counter shaft means, and the differential mechanism are configured from left in a vehicle transverse direction in a plan view of the vehicle.

12. The electric vehicle according to claim 8, further comprising parking lock means for prohibiting rotation of the rear wheels, and
   lock gear means engaged with a lock arm of the parking lock means, said lock gear means being fixed coaxially with the motor output shaft before speed reduction.

13. The electric vehicle according to claim 12, wherein the parking lock means is located above or below the counter shaft means in a vehicle vertical direction, and to overlap the motor means in a side view of the vehicle.

14. The electric vehicle according to claim 8, wherein the vehicle comprises an electric three-wheeled vehicle.

* * * * *